United States Patent [19]

Hartmann

[11] 4,117,980
[45] Oct. 3, 1978

[54] IMPLEMENT, IN PARTICULAR A HOUSEHOLD IMPLEMENT, FOR CHOPPING CUTTABLE MATERIAL, IN PARTICULAR MEAT, ONIONS OR THE LIKE

[75] Inventor: Horst Hartmann, Stuttgart, Germany

[73] Assignee: Zyliss Zysett AG, Switzerland

[21] Appl. No.: 780,097

[22] Filed: Mar. 22, 1977

[30] Foreign Application Priority Data

Apr. 1, 1976 [DE] Fed. Rep. of Germany ....... 2614018

[51] Int. Cl.² .............................................. B02C 18/26
[52] U.S. Cl. ............................... 241/37.5; 241/199.11; 241/205; 241/282.2
[58] Field of Search .................... 241/36, 37.5, 199.2, 241/199.3, 199.8, 199.9, 199.11, 199.12, 277, 205, 282.1, 282.2; 83/411 A

[56] References Cited

U.S. PATENT DOCUMENTS

| 3,189,070 | 6/1965 | Darling | 241/199.9 |
| 3,528,469 | 9/1970 | Mantelet | 241/199.12 |
| 3,892,365 | 7/1975 | Verdun | 241/282.1 X |
| 4,002,298 | 1/1977 | Latora | 241/36 |

FOREIGN PATENT DOCUMENTS

| 1,119,145 | 12/1961 | Fed. Rep. of Germany | 241/199.12 |
| 2,228,189 | 1/1973 | Fed. Rep. of Germany | 241/282.1 |
| 218,812 | 7/1972 | U.S.S.R. | 241/277 |

Primary Examiner—Howard N. Goldberg

[57] ABSTRACT

A cutting device for foods, in which a bowl having a rotatable central shaft is provided with a cover in which a plunger is secured. At the end of the plunger a head having a plurality of knives is located. The plunger and the cover are arranged to enable axial movement of the plunger without rotation of the head, while the knife head and the rotatable shaft are engaged. The latter two are arranged to enable both axial and rotatable movement of the head on the shaft when depressed by the plunger.

22 Claims, 5 Drawing Figures

IMPLEMENT, IN PARTICULAR A HOUSEHOLD IMPLEMENT, FOR CHOPPING CUTTABLE MATERIAL, IN PARTICULAR MEAT, ONIONS OR THE LIKE

BACKGROUND OF THE INVENTION

The invention relates to a food processor and in particular a household implement, for chopping cuttable material, such as meat, vegetables or the like, comprising a cylindrical fixed container for the material to be cut and a shaft having cutting knives, revolving therein, the cutting knives being secured on a knife-head axially movable on the shaft while conjointly rotatable therewith.

Such an implement is generally shown in German Pat. No. 510,862. It has the advantage that the material to be cut is not pressed against a support and thereby ripped apart thereon. The food is in a kind of suspended state as it were, and is divided by the cutting knives straight through as by a slash.

This known implement is driven by a belt drive and for this reason alone is not suitable for use in a household. Besides, the adjusting mechanism for the knife-head on which the cutting knives are fitted is so complicated that the container for the material to be cut is very difficult to empty and to clean.

Another grave disadvantage of the known implement is that during the cutting operation the operator may be injured by the cutting knives. Precisely this lack of safety makes the use of this known implement impossible to use in the home.

It is an object of the invention to design an implement of the above-mentioned kind so that, while retaining the known cutting principle, a manual adjustment of the knife-head can be achieved with simple means. At the same time, the invention provides that the container for the food to be cut be easily removable for emptying and cleaning while full measures are taken to safeguard the user against injury.

SUMMARY OF THE INVENTION

According to the invention, the foregoing objects are achieved in that the drive shaft passes centrally through the bottom of a pot type cutting material container, is drivable by an electric drive unit, and that the container is closable by a cover, wherein a manual plunger is guided non-rotationally but axially movable, the plunger carrying the knife-head rotatably but axially fixed, and held in a rest or starting position by means of a return spring. With this design, the cover forms a removable unit with the plunger and the knife-head. When this unit is released from the cutting material container, there remains in the container at most the shaft, which constitutes no hazard even though the drive unit might be switched on. The container can easily be detached from the shaft or be taken off the drive unit together with the shaft, so that it can easily be emptied and cleaned.

A sufficiently great cutting moment at the cutting knives can be obtained, according to one embodiment, merely with a low-power electric motor, if it is provided that the shaft is drivable through a step-down gear by the driving shaft of the electric motor.

According to one embodiment, it is provided that the shaft is mounted rotatably in the bottom of the container and held axially fixed, and is connectable with the drive shaft of the step-down gear by a coupling. The shaft and the container then form a unit which can easily be connected with the drive unit and be detached therefrom equally easily. The permanent connection between the cutting material container and the shaft has the advantage that during filling of the container the material to be cut comes to lie only in those regions which can be fully reached by the cutting knives during the cutting operation.

The operative connection between the motor and the shaft can be simplified according to a further construction in that one end of the shaft protrudes from the container and this end of the shaft can be introduced into the housing of the drive unit, and can be connected therein to the drive motor directly through the step-down gear. The end of the shaft is then preferably provided with worm gear teeth which mesh with a pinion of the motor shaft.

According to another variant, the container can alternatively be removed without the shaft if the design is such that the shaft is held undetachably in the housing of the drive unit and the container is guided and held removably on the shaft and on the housing of the drive unit. The shaft then forms part of the drive unit.

The shaft may, however, also form part of the unit consisting of cover, plunger and knife-head, if the design is such that the shaft is detachably held in the housing of the drive unit, and the container is guided and held removably on the shaft and on the housing of the drive unit, and further the shaft is held displaceable in the knife-head but captive thereon. This design may include also a coupling between the shaft and the drive unit. Then the design is such that the shaft is displaceable in the knife-head but is held captive thereon, the shaft protrudes from the container by one coupling end and is connectable with a coupling part drivable by the step-down gear of the drive unit. The container is removably guided and held on the shaft and the housing of the drive unit.

To avoid danger to the operator even with the drive unit switched on during application of the cover on the container and the resulting establishment of the engaged connection between shaft and knife-head or of the drive connection between shaft and drive unit, it is provided that the cover has a rim or edge which covers the knife-head present in the starting position.

The fixing and guiding of the plunger on the cover is solved by forming on the cover an outwardly directed guide sleeve which receives a tubular plunger closed by a handle. For the attachment of the knife-head on this plunger it is provided that the knife-head has a sleeve type holder, a part of which is introduced into the open end of the plunger and is rotatable therein but secured so as to be axially fixed. In order that the shaft takes the axially movable knife-head along in rotation in every position, it is provided that in the adjustment range of the knife-head the shaft is non-round, e.g. hexagonal, and that the cross-section of the socket in the knife-head is adapted to this guide portion of the shaft. The non-rotational but axially movable guiding of the plunger in the guide sleeve of the cover is achieved in that the outside of the plunger and the inside of the sleeve of the cover are provided with matching axially extending guide fins and/or grooves.

The return spring for insuring that the starting position of the knife-head is in the upper portion of the cutting material container can be supported in several ways. Thus one possibility is that the return spring applied on the plunger takes support on the guide sleeve of the cover and on the handle of the plunger. A concealed accommodation of the return spring can be achieved in that the return spring in the plunger takes support on the handle of the plunger and on the knife-head.

The design of the knife-head is established in that a collar of the sleeve type knife-head holder bears in the starting position against the inside of the cover, preferably in the region of the guide sleeve formed thereon, and limits the displacement of the plunger.

Optimal utilization of the cutting knives secured on the knife-head for the cutting operation is achieved in that the operative stroke of the plunger is limited by abutment of the handle piece on the guide sleeve of the cover, and that this operative stroke corresponds to the maximum displacement path of the knife-head in the container. The knife-head can be made very small and simple, and each cutting knife is moved practically through the entire cutting material charged in the container.

The fixing of the container during the cutting operation is solved according to one embodiment by forming on the outside of the bottom of the container and on the upper surface of the housing interengaging form-lockingly and non-rotationally keying means.

The cutting operation can be observed, and terminated in time, due to the fact that at least the cutting material container is made of a transparent material, preferably a glas-clear plastic.

BRIEF DESCRIPTION OF THE DRAWINGS

The invention will be explained in greater detail with reference to several examples of construction illustrated in the drawings, in which.

DESCRIPTION OF THE INVENTION

Figure 1:
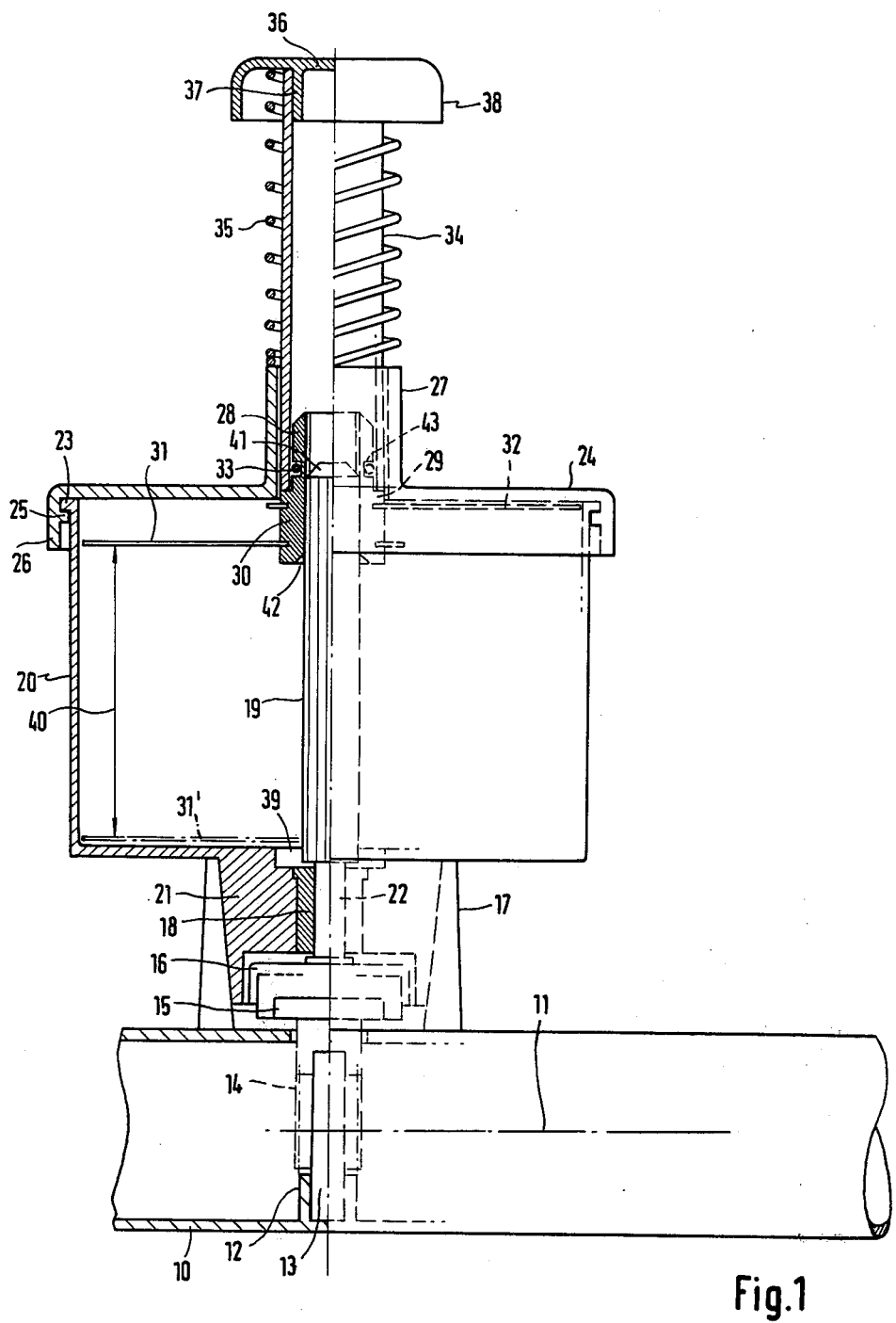
FIG. 1 shows an implement wherein the shaft is rotatably mounted in the cutting material container and is connectable with an electric drive unit through a coupling or clutch.

As seen in FIG. 1, the implement includes a support housing 10 for an electric drive unit arranged so that the motor shaft 11 of the electric motor is horizontal. A bearing sleeve 12 is formed in the housing 10 and has a bearing pin 13 fixed therein. A worm wheel 14 is rotatably mounted on the bearing pin 13. This worm wheel 14 extends out of the housing 10 and is formed at its outer end with a friction coupling part 15. Surrounding the coupling part 15 is a take-up socket like member 17 having a conical interior surface.

Seated on the housing is a cutting material container 20 of a pot type design. The bottom of container 20 is provided with a concially exterior hub 21 which is guided and removably held in known manner in the take-up socket 17 during the cutting operation. Within the hub 21 is inserted a bearing bushing 18 which receives the smooth bearing portion 22 of a drive shaft 19.

The smooth portion 22 is off-set in diameter from the remainder of the shaft to be rotatably but axially fixed within the bushing. The lowermost end of shaft 19 protruding from the guide cone 21 carries a coupling counter-piece 16, through which shaft 19 is cooperatively connected to the driven coupling part 15. Shaft 19 is thus inseparably connected with container 20 as one unit, which can easily and quickly be placed on the housing 10 in connection with drive unit 11 and be separated therefrom. This is of advantage in filling, emptying and cleaning the container 20.

The shaft 19 extends upwardly through the container 20. The container 20 is closable by a removable cover 24. Container 20 and cover 24 carry the matching bayonet locking elements 23 and 25 so that the cover 24 can be firmly connected with container 20 and will not unintentionally become detached from container 20 during the cutting operation. The direction of rotation of cover 24 for closing it on the container preferably coincides with the direction of rotation of the knife-head, which will be explained in greater detail below.

Cover 24 has peripheral edge 26, which depends as an anular skirt to cover up the knife-head when it is in the starting position, and an axially upwardly directed sleeve 27 concentric about its central axis a tubular manual plunger 34, having an upper open end face covered by a handle 36 is introduced for slidable movement in the sleeve 27. The handle 36 is provided with a fastening sleeve 37 which fits into the tubular plunger 34 and is fixed therein. The handle piece 36 has a depending skirt edge 38 which serves as a support bearing for a compression return spring 35, which is slipped over the plunger 34 and is supported at its other end on the upper end face of the guide sleeve 27 of cover 24.

The lower end of the plunger 34 extends to the underside surface of cover 24. Introduced into this lower end is a sleeve type holder 30 having an attachment part 28 which is held in the plunger 34 by a clamping spring 33 located in a groove 43. The holder 30 is formed with a collar 29 which abuts against the lower edge of the plunger 34. In this manner the holder 30 is rotatably secured on the plunger 34, but is also axially fixed thereon. The lower end face of plunger 34 takes support on the collar of holder 30, so that when plunger 34 is moved, holder 30 is necessarily moved also.

Two cutting knives 31 and 32 are fastened on holder 30 diametrically opposite each other. If holder 30 is made as a plastic part, the cutting knives 31 and 32 can be molded fixedly therein. The shaft 19 is provided at the upper end with a chamfer 41, so that when applying the cover 24 on the container 20, the knife-head (i.e., holder 30 and knives 31 and 32) can be introduced easily. For this reason the holder 30 has, facing the container 20, a conically widening admission opening 42. The two cutting knives 31 and 32 are axially offset relative to each other. In the rest position the collar 29 of holder 30 is held against cover 24, preferably in the region of the guide sleeve 27 and the edge 26 of cover 24 depends to cover at least the lowermost cutting knife 31 while the cutting knife 32 is at a small distance from the underside of cover 24. This rest position permits the assembly of cover, plunger, knives, etc. to be handled with relative safety both when free of the cup 20 and when attached thereto, as shown in FIG. 1. In FIG. 1 the knives are shown in the starting position for cutting.

The inner surface of the holder 30 of the knife-head and the surface of the shaft 19 is provided with axially directed mating guide fins and/or grovves which permits the holder 30 to axially move along shaft 19 and therefore can be adjusted along the entire length of the shaft 19 but prevents relative rotation of the holder about the shaft 19 so that the knife-head (i.e., holder and knives) is then securely taken along in rotation with the shaft 19 independently of its axial position on shaft 19. In the same or a similar manner the plunger 34 is guided in the guide sleeve 27 of cover 24 so as to be relatively non-rotationally but axially movable therewith. Since the holder 30 is mounted in the plunger 34 so as to be rotatable over its fastening member 28, rotation of the knife-head itself does not cause the plunger 34 to be taken along in rotation when it itself is caused to rotate by movement of shaft 19.

Plunger 34 can be axially displaced (i.e. depressed) until the handle 36 strikes against the upper end face of the guide sleeve 27. This operative stroke of plunger 34 corresponds to the displacement path indicated by arrow 40, of the knife-head in the cup 20. The cutting knife 31 occupies the position 31' and is at a small distance from the bottom of container 20 when fully depressed. To facilitate this, the bottom of container 20 in the area of the bushing 18 has a depression 39, into which the holder 30 can be introduced. When the plunger 34 is let go, the return spring 35 brings the plunger 34 with the knife-head back to the starting position shown. While so doing, the knife-head continues to be taken along in rotation by shaft 19.

The cover 24 can be easily taken off container 20 by release of the bayonet locking elements 23, 25, and the knife-head pulled off shaft 19. The layout of the cover 24, the knife-head and shaft 19 is such that the fins and grooves thereon do not mate at the extreme upper end of the shaft 19 so that the cover skirt edge 26 is released from the container 20 precisely when the knife-head comes out of mating engagement with shaft 19. In this way the cutting knives are no longer driven by shaft 19 when they are bared. Nor is there any danger of injury should shaft 19 continue to execute rotary movements upon removal of cover 24. Conversely, when placing cover 24 on container 20, the knife-head comes into operative connection with shaft 19 only when the edge 26 of cover 24 covers the container 20 so that access to the cutting knives 31 and 32 is prevented.

Naturally the implement according to FIG. 1 can alternatively be constructed so that the motor shaft 11 extends vertically and drive shaft 19 horizontally. In addition, shaft 19 with the coupling counter-piece 16 may be detachably fixed in the guide cone 21 of container 20.

Figure 2:
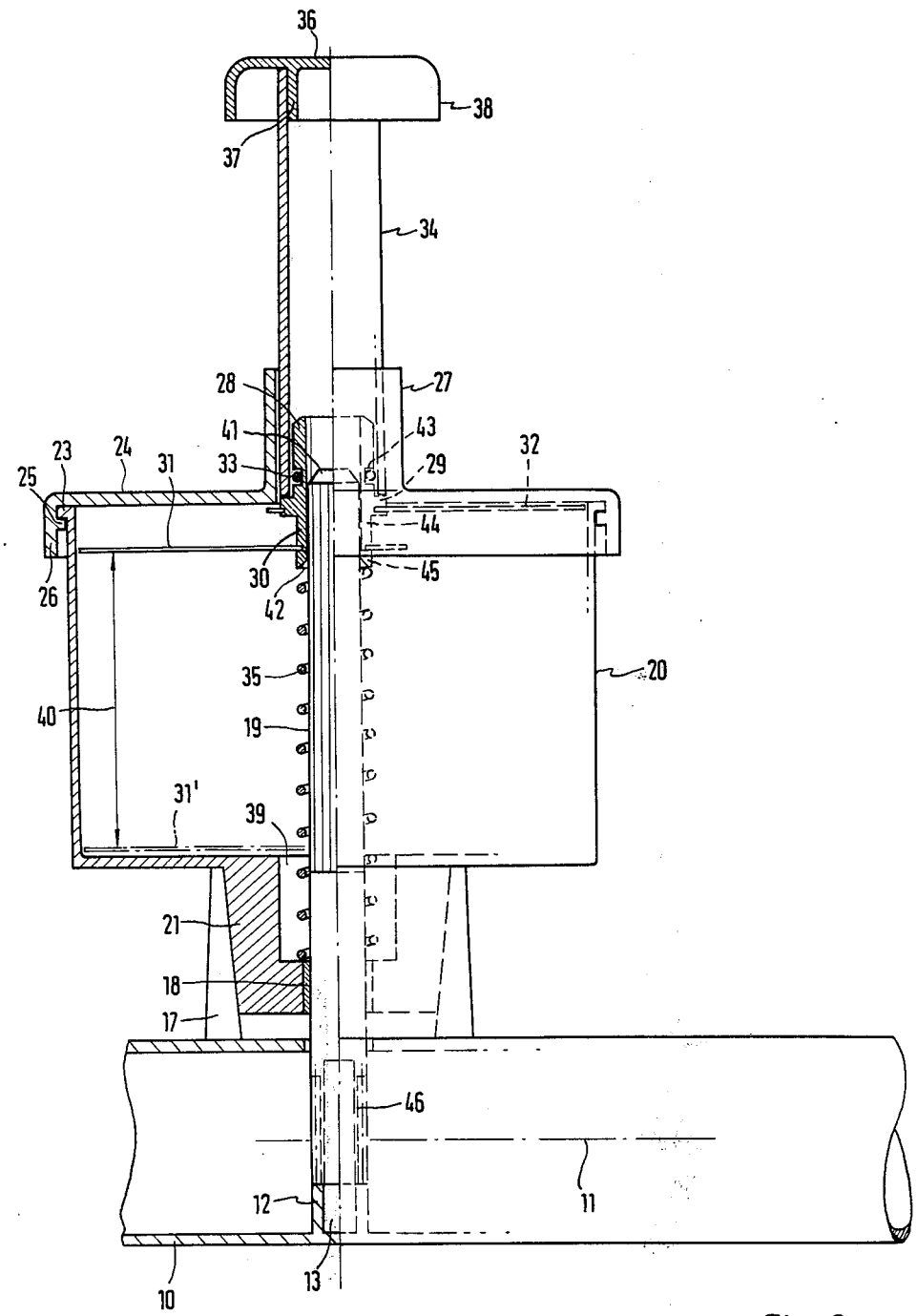
FIG. 2 an implement wherein the shaft is secured in the drive unit undetachably, and the cutting material container is removably guided and held on the shaft and on the drive unit.

In operation and mode of function, the implement according to FIG. 2 does not differ from the implement according to FIG. 1 although the knife-head is designed differently. The two knives 31 and 32 are fixed to the holder 30 by connecting together the rings 44 and 45 which are slipped on the sleeve type holder 30 and secured thereon, i.e. firmly connected with holder 30. The shaft 19 is freely guided in the bushing 18 so that the cutting material container 20 can be taken off shaft 19. The lower end of shaft 19 extends fully downward and is introduced into the housing 10 for connection with the drive unit 11. The bearing pin 13 can here be fixed in the bearing sleeve 12, while shaft 19 itself may be provided with worm gear teeth 46, which mesh with the pinion of the motor shaft. Shaft 19 may be fixed in the housing 10 permanently or releasably. In the latter case shaft 19 can be removed from the drive unit 11. In any case, however, container 20 can be filled, emptied and cleaned without shaft 19. As is shown, the return spring 35 can also be placed about the shaft 19, so that it takes upper support on the holder 30 of the knife-head and bottom support on the container 20.

Figure 3:
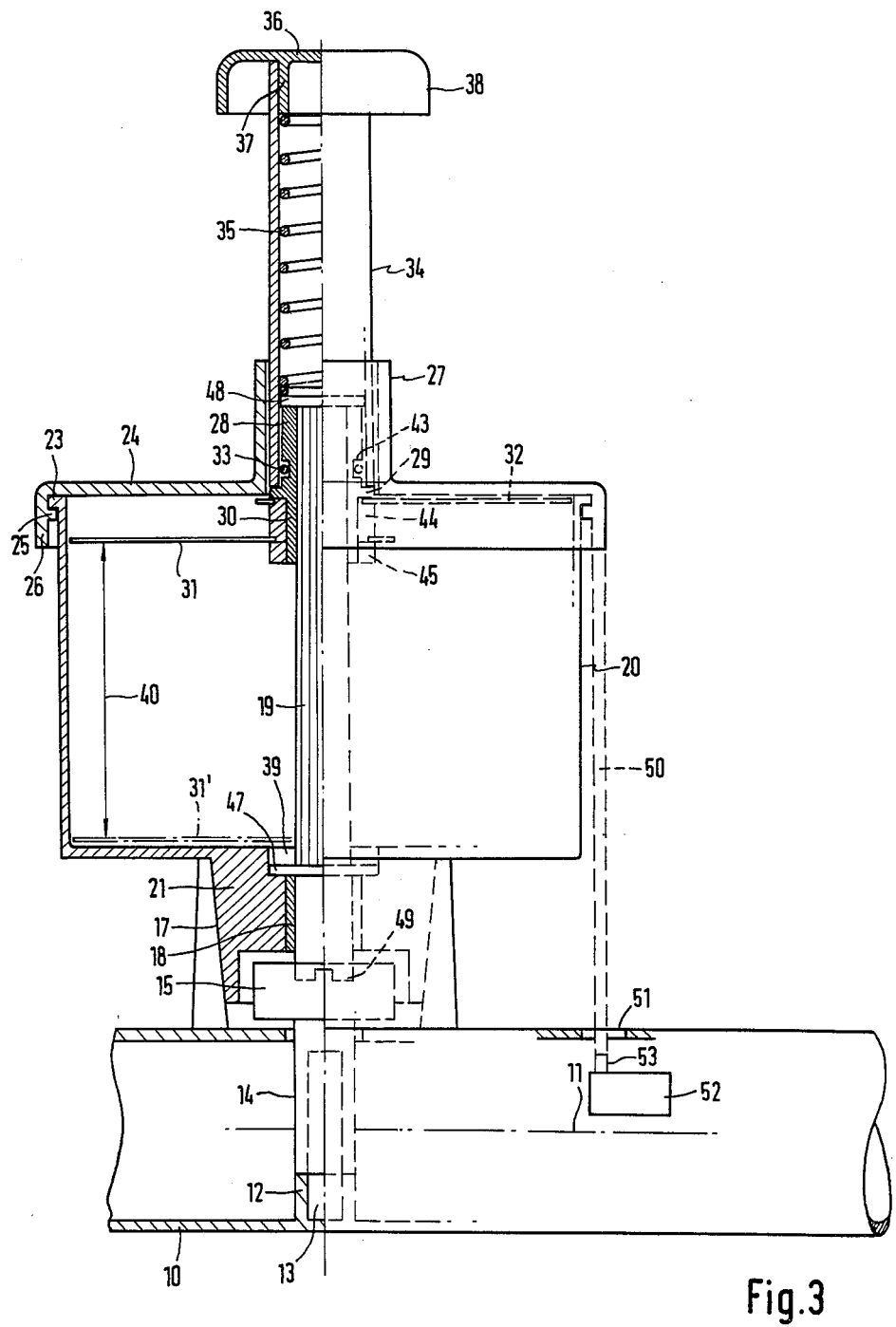
FIG. 3, an implement wherein the shaft is held captive on the knife-head, is guided in the bottom of the cutting material container and is connectable with the drive unit through a coupling.

In the embodiment according to FIG. 3, the shaft 19 is axially movable into the holder 30 of the knife-head, but it is then held captive therein. This is accomplished by introducing the shaft 19 into the holder 30, from above, before the attachment member 28 of holder 30 is fixed in plunger 34, the top end of the shaft 19 is provided with end stop 48 preventing it from falling out of the holder 30. With this design the return spring 35 can easily be accommodated in plunger 34; it then takes support on the handle piece 36 and on the end stop 48 of shaft 19. The lower end of shaft 19 is rotatably guided in the bearing bushing 18 and takes support through a flange stop 47 on the bottom of container 20. The lowermost end of shaft 19 protruding from the guide cone 21 is designed as coupling counterpiece 49 and can be keyed or connected in force-fit with the driven coupling part 15 in known manner. The worm wheel 14 and coupling part 15 may be made in one piece. All of the embodiments have in common the fact that the knife-head can be displaced along the shaft 19 by actuation of the plunger 34. For this the knife-head must be axially movable on shaft 19, but it must not revolve relatively about this shaft 19 and must participate conjointly in the rotary movements thereof. The knife-head is connected with the plunger 34 rotatably but axially fixed. Plunger 34 is guided in cover 24 axially movable but non-rotationally. Cover 24, plunger 34 and the knife-head form a unit, which is connectable with the cutting material container 20. Container 20 in turn is guided and held on the housing 10 of the drive unit 11 and can easily be removed therefrom. This basic construction of the new implement is very simple and always fulfills the safety regulations prescribed for such utensils without additional measures.

As indicated in broken lines 50, in FIG. 3, the edge 26 of cover 24 may be extended downwardly so as to completely cover the cutting material container 20 placed on the drive unit 11. Here at least a projection of the extended cover edge 50 can be introduced through an opening 51 into the housing 10 of the drive unit and utilized therein for the displacement of the actuating member 53 of at least one safety switch 52.

The implement can be switched on only after the cover 24 has been fully applied and the safety switch 52 operated. The extended cover edge 50 offers additional protection, since even if container 20 is destroyed, the knives 31 and 32 are still completely shielded and are not accessible.

Figure 4:
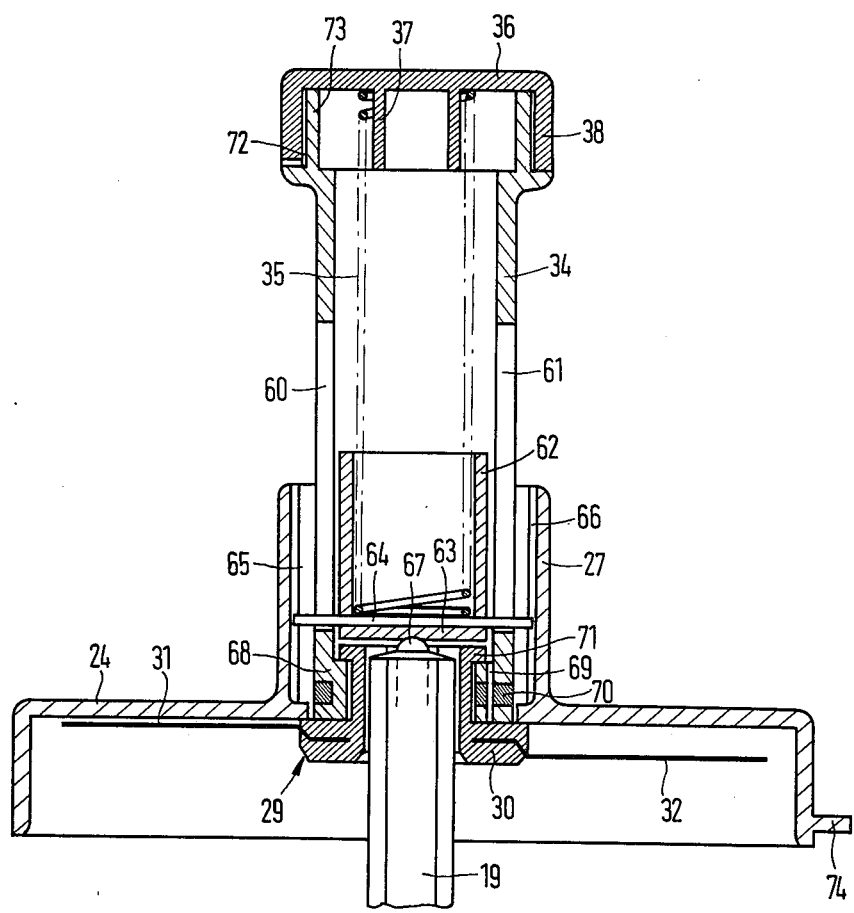
FIG. 4, a partial view of the implement, wherein the holder of the cutting knives is easily removable.

A design of the cover-plunger unit wherein the knife-head can be taken off easily and without danger is shown in FIG. 4. Plunger 34 is closed by the handle 36, the peripheral skirt 38 being connected with a receiving sleeve 73 formed on the upper end of plunger 34 through a snap or bayonet connection 72. The return spring 35 now takes support, not on the knife-head, but on the bottom 63 of a guide pot 62, which is axially movable in plunger 34. A cross pin 64 is passed through the guide pot 62 and is guided by its ends in axially extending inner grooves 65 and 66 of the guide sleeve 27 of cover 24. The displacement path of plunger 34 is limited by the diametrically arranged slots 60 and 61, in which the cross pin 64 is guided. The guide pot 62 takes support at the bottom 63 on the end face of the preferably hexagonal shaft 19, namely over the protruding spherical end of the metal insert 67.

When cover 24 is removed from container 20, the return spring 35 pushes the cross pin 64 against the lower ends of the slots 60 and 61. The cover 24 can be moved farther upward because the inner grooves 65 and 66 in the guide sleeve 27 permit it thereby the knife-head, which is fixed at the lower end of plunger 34, is released and can easily be exchanged and cleaned. For this purpose the lower end of plunger 34 terminates in a semicircular uptake 68, which has an outer groove and inwardly forms a fin which fits between the two frontal collars 29 and 71 of the holder 30 of the knife-head. The knife-head can thus be introduced radially into this uptake 68. A similarly formed closure piece fixes the knife-head. This closure pieces closes the plunger flush toward the outside and carries a closure yoke 70, which is articulated on the closure piece through the hinge pin 69. Yoke 70 is pivoted and snapped into the outer groove of uptake 68 in the direction of rotation of the knife-head. Thus the knife-head can be removed from plunger 34 without having to overcome any spring force. With the knife-head removed, moreover, cover 24 can be pulled off the plunger 34. The plunger-cover unit is therefore easy to take apart and to reassemble.

Figure 5:
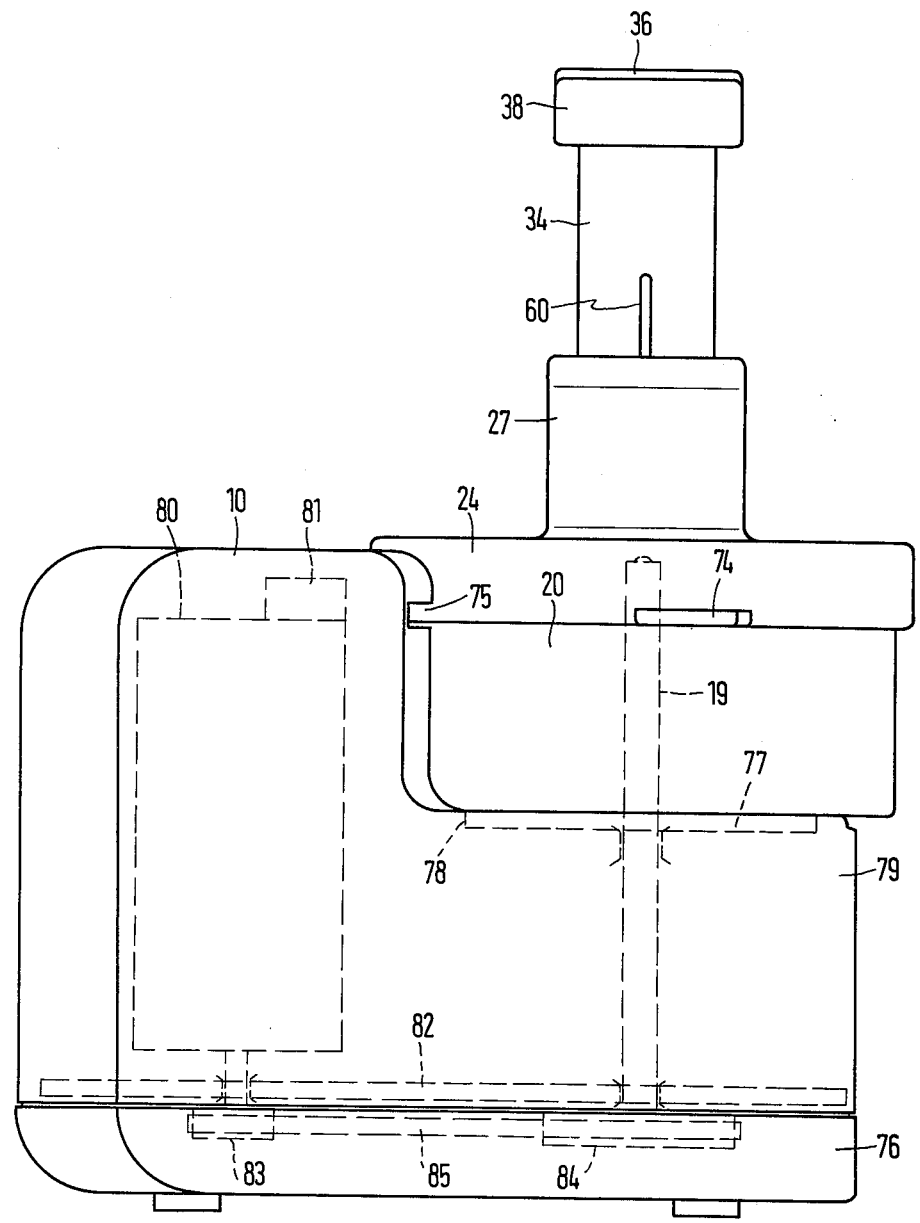
FIG. 5, a side view of a different design of the implement.

On the outer edge the cover 24 carries a switch lug 74, which as seen in FIG. 5 can be screwed through a slot 75 into the interior of the housing 10 of the drive unit. Cover 24 is then held in axial direction of shaft 19 in housing 10 and can actuate an electric switch, e.g. a microswitch. The implement can thus be switched on only with the container 20 in place and cover 24 applied, the safety regulations being obeyed optimally.

Container 20 has at the bottom a lug 77, which is force fitting by introducing into a take-up or recess 78 in the shoulder 79 of housing 10. Thus container 20, mounted on shaft 19, cannot turn.

On cover 24 is formed another stop which limits the rotary movement of the cover by abutment against housing 10 upon switching off. This comprises an electric switch 81 which is preferably self-triggering, so that when plunger 34 is let go, the cover 24 with the plunger 34 is brought back and the implement switched off. The return spring of the switch is strong enough for the switching lug 74 of cover 24 to be screwed out of the slot 75 in housing 10 and so that it can then be taken off.

The bottom pan 76 of housing 10 shields a separate gear space, in which intermediate wheels 83 and 84 are coupled through the toothed belt 85. The toothed belt 85 can therefore be exchanged without danger, as the electric motor 80 and the switch 81 are inaccessibly covered by the mounting plate 82.

I claim:

1. Apparatus for cutting foods comprising a cup-like container, a base supporting said container, drive means located in said base having a rotatable shaft the upper end of which extends into said container, a removable cover for said container, said cover having an integral sleeve extending upwardly therefrom, an elongated plunger located in said sleeve and having an inner end facing said container, said sleeve and said plunger having cooperative keying means permitting said plunger to move relatively axially but non-rotationally within said sleeve, cutting means comprising a head secured to the inner end of said plunger to be rotationally but not axially movable relative thereto, said head having at least one knife extending radially therefrom, and a central opening in said knife head adapted to fit over the upper end of said shaft, said central opening and said shaft, being cooperatively connected by keying means permitting relative axial movement and conjoint rotational movement of said cutting means with said shaft upon movement of said plunger a selected distance through said sleeve into said container, and spring means for normally biasing said plunger in an outward direction of said container by at least said selected distance, said cover, said plunger and said knife head being connected so that upon removal of said cover from said container said knife head is disengaged from said shaft and together with said plunger and cover is removed from said container.

2. The apparatus according to claim 1, wherein the shaft is driven through a gear transmission an electric motor.

3. The apparatus according to claim 2, wherein the lower end of the shaft is rotatably mounted in the bottom container and is held axially fixed, and is connectable by means of a coupling with the transmission.

4. The apparatus according to claim 2, wherein the lower end of the shaft protrudes through the container into the base and is driven directly through the transmission.

5. The apparatus according to claim 4, wherein the lower end of the shaft is fixedly journalled in the base, and the container is removably held on the shaft and the base.

6. The apparatus according to claim 5, characterized in that the upper end of the shaft is held in the knife-head, and the lower end of the shaft protrudes into said base and is provided with a first coupling connectable with a second coupling part drive by the step-down gear train.

7. The apparatus according to claim 4, wherein the lower end of the shaft is detachably journalled in the base, and the container is removably held on the shaft and on the base, the upper end of the shaft being held in the knife-head.

8. The apparatus according to claim 1, wherein the cover has a depending edge which covers the knife-head when in the normally biased position.

9. The apparatus according to claim 1, wherein the plunger is tubular and is closed by a handle piece at its outer end.

10. The apparatus according to claim 9, wherein the knife-head is tubular and has a stepped down portion introduced into the open end of the plunger and is rotatably but axially fixed therein.

11. The apparatus according to claim 9, wherein the spring means comprises a compression spring slipped over the plunger taking support against the sleeve of the cover and against the handle of the plunger.

12. The apparatus according to claim 10, wherein the knife-head is provided with a collar bearing in the starting position against the inside of the cover limiting the displacement of the plunger.

13. The apparatus according to claim 12, wherein the movement of the plunger is limited by abutment of the handle piece against the sleeve of the cover, this movement corresponding to the maximum displacement path of the knife-head in the container.

14. The apparatus according to claim 13, wherein at least the container is made of transparent material.

15. The apparatus according to claim 14, wherein the outside bottom of the container and the base are provided with interengaging form-lockingly and non-rotationally seating means.

16. The apparatus according to claim 1, wherein the keying means on the plunger and the sleeve of the cover comprise axially extending guide fins and grooves.

17. The apparatus according to claim 1, wherein the spring means comprises a compression spring arranged in the plunger taking support against the handle piece of the plunger and against the knife-head.

18. The apparatus according to claim 17, including the guide pot with said plunger on which the spring bears said guide pot being guided by means of a guide pine extending radially through said guide pot into a pair of diametrically opposed axial internal grooves formed in the sleeve of the cover, said shaft having an installed metal insert, terminating spherically at the end face, engaging the bottom of the guide pot, said knife-head being held by a collar to the cover.

19. The apparatus according to claim 18, wherein the knife-head is a sleeve having two frontal collars, the knives being fixed in one collar, said plunger terminating facing the knife-head, in a U-shaped semicircular guide with outer groove, said knife-head being radially insertable in the U-shaped guide and is held therein with a complementary U-shaped semicircular closure piece and a closure yoke securing the closure piece on the plunger.

20. The apparatus according to claim 19, wherein the closure yoke is rotatably connected with the closure piece and is snapped into the outer groove of the semicircular guide of the plunger in the direction of rotation of the knife-head.

21. The apparatus according to claim 20, wherein the container is arranged on a shoulder of the base, and that the cover has a switching lug on its edge which is introduced through a slot into the interior of the housing and there actuates a self-triggering switch which controls the drive means.

22. The apparatus according to claim 21, wherein the direction of rotation of the knife-head is contrary to the switching-on direction of the cover with the switching lug, and that the cover is provided with a stop which limits the rotational movement of the cover in switching-off direction.

* * * * *